United States Patent [19]

Kent

[11] 4,224,208

[45] Sep. 23, 1980

[54] TIRE PROTECTION COMPOSITION

[75] Inventor: Jerry B. Kent, Arlington, Tex.

[73] Assignee: New World Products, Inc., Arlington, Tex.

[21] Appl. No.: 5,011

[22] Filed: Jan. 22, 1979

Related U.S. Application Data

[63] Continuation-in-part of Ser. No. 768,024, Feb. 14, 1977, Pat. No. 4,137,206.

[51] Int. Cl.² .............................................. C08L 29/04
[52] U.S. Cl. ............................... 260/29.6 B; 152/347; 260/29.6 BE; 260/29.6 BM
[58] Field of Search .................... 260/29.6 B, 29.6 BE, 260/29.6 BM, 42.51; 152/347

[56] References Cited

U.S. PATENT DOCUMENTS

| | | | |
|---|---|---|---|
| 3,352,696 | 11/1967 | Wallace | 106/33 |
| 4,101,494 | 7/1978 | Augostini | 260/29.6 B |
| 4,137,206 | 1/1979 | Kent | 260/29.6 B |

*Primary Examiner*—Lewis T. Jacobs
*Attorney, Agent, or Firm*—Gerald G. Crutsinger; John F. Booth; Harry C. Post, III

[57] ABSTRACT

A liquid tire sealing composition containing an organic volatile amine or amine salt soluble therein, which is effective to impart corrosion resistance to the metallic belts of a belted tire. The organic volatile amine or amine salt component is selected from the group consisting of lower alkylamines, lower cycloalkylamines, naphthylamines, morpholines, benzothiazoles and benzoate, carbonate and nitrite salts thereof. The composition is introduced into the metallic-belted tire cavity, and the volatile amine penetrates through the rubber and lays down a protective coating on the metallic belt without harming the metal to rubber bonding.

12 Claims, No Drawings

TIRE PROTECTION COMPOSITION

BACKGROUND OF THE INVENTION

This is a continuation-in-part of my application Ser. No. 768,024, filed Feb. 14, 1977, now U.S. Pat. No. 4,137,206, issued Jan. 30, 1979.

A problem associated with metallic belt reinforced tires is wire corrosion. As noted in the U.S. Pat. No. 2,792,868 the problem of corrosion is due to the fact that the metallic wires disposed within the tire are in an environment wherein because of the permeability of elastomers to water vapor, corrosion is apt to take place. This is particularly the case if small amounts of moisture gain entrance to the interior of the tire carcass. The corrosive pitting of metallic surfaces such as the surface of a steel wire can cause corrosion fatigue failure.

Corrosive pits in the surface of corrosion susceptible wires such as steel wires serve as points of localized stress as the wires are continually flexed during normal operating deflection of the tire. This condition leads to eventual breakage of the wires in the belt, thus reducing the strength thereof.

The tire manufacture art has experienced difficulty in dealing effectively with the problem of corrosion in metallic wires of belted tires. In an attempt to avoid corrosion, substitution of non-corosive wire such as aluminum in place of steel wire has been suggested. However, chemical pretreatment of susceptible wire belting has been excluded as a solution for the corrosion problem, because the metallic surface modification which is beneficial in inhibiting corrosion is detrimental to bonding of elastomer to the metal wiring.

As noted by reference to U.S. Pat. Nos. 3,676,256; 3,480,508; 3,425,886; 3,423,270; 2,987,095 and 2,912,355, there has been a continual effort to improve adhesion of an elastomer to metallic wiring within a tire carcass. Accordingly any viable solution to the problem of corrosion inhibition cannot adversely affect the bonding of elastomer to metal within the tire.

I have discovered a composition and method of treating wire belting which inhibits corrosion and does not adversely affect the elastomer to metal bonds. The invention involves the treatment of metallic wires incorporated within the tire carcass after fabrication of the tire, and hence subsequent to bond formation between the rubber and metal tire components.

As heretofore noted the problem of metallic wire corrosion is largely attributable to the permeability of elastomers to water vapor. I have discovered that the characteristic of vapor permeability which is the cause of the corrosion problem also provides a means for overcoming the problem.

I have further found that the elastomer compositions employed in steel belted tires are permeable to certain volatile organic amines and the benzoate, carbonate and nitrite salts thereof. The volatile amines may be characterized as vapor phase corrosion inhibitors.

When introduced within the tire chamber as solute within a tire sealing and/or balancing composition, certain organic amines volatilize within the chamber, migrate to the elastomer of the tire and permeate into the elastomer of the tire and also permeate through the elastomer to the metallic wire belting whereupon the amines form a protective coating. There is no adverse effect upon the elastomer nor the elastomer to metal bonding within the tire.

Volatile amines and certain salts thereof have previously been employed for corrosion inhibition of metallic equipment and other articles of manufacture. The use of volatile organic amines for the foregoing purpose is disclosed for example in U.S. Pat. Nos. 2,512,949; 2,643,178; 2,889,276; 3,398,095 and 3,977,994. However, the ability of certain volatile organic amines, or the nitrite, benzoate or carbonate salts thereof, upon introduction into a tire cavity, to inhibit corrosion of metallic belts enclosed in the elastomeric tire carcass, has not been previously appreciated.

SUMMARY OF THE INVENTION

The present invention provides a liquid tire sealing and/or balancing composition which contains a volatile organic amine component. Upon introduction into the cavity of a metallic belted tire, the volatile amine migrates to the inner surface of the tire, penetrates into and through the elastomer to the metallic wire surfaces of the reinforcing belt, and forms a protective coating upon such metal surfaces. The contact of the amine with the metal is effected in situ, and within the tire carcass, subsequent to tire fabrication and hence after formation of the metal to elastomer bonding in the tire. The amine does not interfere with either polymerization, vulcanization or metal-elastomer bonding.

The tire sealing and/or balancing composition which provides in situ, within a metal belted tire, corrosion inhibition to the elastomer embedded metallic wire belting, is a liquid composition which contains an organic volatile amine or amine salt soluble therein and selected from the group consisting of lower alkylamines, lower cycloalkylamines, naphthylamines, morpholines, benothiazoles, and benzoate, carbonate and nitrite salts of said alkyl-, cycloalkylamines, morpholines and benzothiazoles.

Any liquid tire sealing and/or tire balancing compositions within which the above-recited amines or their salts are soluble may be employed as a vehicle for delivery of the amines to the elastomer encased wires or metallic belts of a metallic belt reinforced tire.

Suitable tire sealing and balancing compositions are those disclosed in U.S. Pat. No. 4,101,494. These compositions comprise aqueous solutions of polyvinyl alcohol and have an asbestos fibrous component. The viscosity of the compositions measured at 100° F. (38° C.) is within the range of about 1000 to about 2200 cps as measured with a Brookfield viscometer, Model LVF, #1 spindle, at 60 rpm. Such compositions may contain fiberglass fibers as an additional fibrous component and may also contain antifreeze components, such as ethylene or diethylene glycols as well as bactericides, coloring agents and a corrosion inhibiting compound for the wheels.

Other suitable tire sealing and balancing compositions are those comprising aqueous solutions of methylcellulose and having an asbestos fibrous component. The viscosity of these compositions measured with a Haake viscometer at 84° F. generally is within range of from about 1000 to about 3000 cps. Such compositions may contain fiberglass fibers as an additional fibrous component and may also contain antifreeze components, such as ethylene or diethylene glycols as well as bactericides, coloring agents and a compound for the corrosion inhibition of the wheels. Additionally, methylcellulose formulations containing natural gums such as disclosed in U.S. Pat. No. 3,352,696 are also suitable but I have found the most suitable wheel corrosion inhibitor is a mixture of sodium nitrite and sodium tetraborate pentahydrate.

The lower alkylamines must be volatile under the conditions of tire utilization. The lower alkylamines can be monosubstituted or polysubstituted; that is, disubstituted or trisubstituted. The term "lower" is used to define moieties containing from about 1 to about 6 carbon atoms such as methyl, ethyl propyl, butyl, amyl and hexyl groups. The lower alkylamines include N-substituted lower alkylamines. Some representative examples of these lower alkylamines include methylamine, dimethylamine, trimethylamine, propylamine, isopropylamine, dipropylamine, diisopropylamine, N-(methyl)-N-isopropylamine, tripropylamine, mono-, di-, and tributylamine, mono-, di-, and triisobutylamine, mono-, di-, and trisecbutylamine, N-(propyl)-N-secbutylamine, amylamine, N-(butyl)-N-amylamine, tertiary butylamine, N-(methyl)-N-diamylamine, N-(etnanol)-N-ethylamine, N-(2-ethanol)-N-propylamine, isopropylcyclohexylamine, etc. It is to be understood that these lower alkylamines and substituted lower alkylamines are only representative of the class of compounds which may be used and that the invention is not necessarily limited thereto. In addition, benzoate, carbonate, or nitrite salts of the lower alkylamines may be used.

The lower cycloalkylamines, in like manner as the lower alkylamines, must be volatile under the conditions of tire utilization. The lower cycloalkyl amines may be monosubstituted or polysubstituted. The term "lower" is used to define cycloalkyl moieties containing from about 3 to about 6 carbon atoms; that is, the cyclopropyl, cyclobutyl, cyclopentyl and cyclohexyl groups. The cycloalkyl groups may be substituted and the lower cycloalkylamines include N-substituted lower cycloalkylamines. Some representative examples of these lower cycloalkylamines include cyclopropyl amine, dicyclopropyl amine, cyclobutyl amine, N-(cyclopropyl)-N-cyclobutylamine, cyclopentylamine, alkylated cyclopentyl amine, cyclohexylamine, dicyclohexylamine, isopropyl cyclohexylamine, etc. In addition, benzoate, carbonate or nitrite salts of the lower cycloalkylamines may be used such as dicyclohexylammonium carbonate, cyclohexylammonium carbonate, N-(methyl)-N-cyclopenthl ammonium nitrite, etc. It is to be understood that these lower cycloalkylamines and substituted lower cycloalkylamines are only representative of the class of compounds which may be used and that the invention is not necessarily limited thereto.

Also suitable as volatile organic amine or amine salt inhibitors are the naphthylamines, morpholines and benzothiazoles. As in the case of the lower alkylamines and cycloalkylamines the foregoing compounds must be volatile under conditions of tire utilization. The preferred naphthylamines, morpholines and benzothiazoles include naphthalamine, ethylmorpholine, 2-benzothiazolethiol and the carbonates, benzoates and nitrites thereof.

Particularly effective combinations of volatile organic amines are those of 2-benzothiazolethiol and cyclohexylamine and the carbonates and benzoates thereof and dicyclohexylammonium carbonate and hexahydrobenzoate. In addition, the combination of amylamine and ethanolamine is also very effective.

The liquid tire balancing and/or sealing composition comprises a liquid component within which the volatile amines or their salts are soluble. It is the vehicle for delivery of the volatile amines to the elastomeric inner surface of the tire. In the course of the balancing and sealing composition utilization, the environment within the pressurized tire causes the volatile amines to migrate to the elastomeric surface, penetrate through the rubber and lay down a protective coating on the metallic wires encased within the tire carcass.

Tire balancing and sealing compositions comprising polyvinyl alcohol solutions containing fibrous components are suitable delivery vehicles.

In such tire balancing and sealing composition the amount of polyvinyl alcohol present is expressed, relative to the water content, by ratio of polyvinyl alcohol to water, this being from about 0.5:100 to about 5.0:100. The preferred ratio of polyvinyl alcohol to water is from about 0.5.100 to 1.0:100.

The polyvinyl alcohol employed in the tire sealing and balancing composition may be of low, medium or high viscosity and may be partially hydrolyzed, fully hydrolyzed or super hydrolyzed.

Polyvinyl alcohols are manufactured by polymerizing vinyl esters or vinyl acetates and hydrolyzing the polymers to the alcohol. The degree of polymerization is reflected by solution viscosity and is specified by the viscosity of a 4% aqueous solution.

One preferred polyvinyl alcohol is fully hydrolyzed and of medium viscosity. An example of such a polyvinyl alcohol is VINOL 325 manufactured by Air Products, Wayne, Pa. VINOL 325 is a polyvinyl alcohol from 98.0 to 98.8 percent hydrolyzed polyvinyl acetate, and a 4% by weight aqueous solution has a viscosity of 28–32 cps as measured with a Brookfield viscometer, Model LVF, #1 spindle, 60 rpm, 20° C.

Another preferred polyvinyl alcohol is partially hydrolyzed and of medium viscosity. An example of such a polyvinyl alcohol is VINOL 523, also manufactured by Air Products, Wayne, Pa. VINOL 523 is a polyvinyl alcohol of from 87.0–89.0 percent hydrolyzed polyvinyl acetate, and a 4% by weight aqueous solution of same has a viscosity of 28–32 cps as measured with a Brookfield viscometer, Model LVF, #1 spindle, 60 rpm, 20° C.

The fibrous component is comprised of asbestos fibers. Preferably the fibrous component consists of from about 4% to about 10% by weight of said tire balancing and sealing composition.

These asbestos fibers may be of varying length, preferably of a length of from about 0.01 to about 3.0 inches. A mixture of fibers of varying length and within the foregoing range, with the predominant lengths falling within the range of from about 0.5 to about 1.2 inches, is most preferred. The short and long fibers facilitate sealing of small and large punctures respectivly.

The fibrous component may also contain fiberglass fibers, the ratio of asbestos to fiberglass fibers being from about 20:1 to about 100:1. The fiberglass fibers preferably are about 0.25 inches±0.125 inches in length.

Also, the fibrous component may be composed entirely of fiberglass fibers. The fiberglass fibers are preferably from 0.25 inches to about 1 inch in length.

Tire sealing and/or balancing compositions wherein the fibrous component comprises fiberglass fibers include those containing aqueous solutions of polyvinyl alcohol or methylcellulose.

One such formulation comprises a fibrous component of fiberglass fibers and an aqueous solution of polyvinyl alcohol another comprises a fibrous component of fiberglass fibers and aqueous solution of methylcellulose. The viscosity of the polyvinyl alcohol containing formulations is preferably in the range of from about 1000 to about 2200 cps. at 100° F. (38° C.). The viscosity of the methylcellulose containing formulations is preferably in the range of from about 1000 to upward of 3000 centipoise at 84° F. (29° C.).

In preparing the tire sealing and balancing composition, the fibrous component is presoaked by immersion in water prior to introduction of the fibrous component into the aqueous solution of polyvinyl alcohol. Presoaking functions to reduce air entrapment and wetting time. Preferably the water utilized for presoaking contains a wetting agent which may be of either the cationic or anionic or non-ionic type. Examples of such agents are ADVOWET-33, a non-ionic, non-foaming active wetting agent manufactured by Advance Solvents and Chemical Corporation of New York, N.Y.; INTERSTAB 33, a wetting agent manufactured by Interstate Chemicals, Inc., 500 Jersey Ave., New Brunswick, N.J.; and FC 431, a wetting agent manufactured by Minnesota Mining and Manufacturing Company.

To prevent corrosion of the wheel upon which the tire is mounted, a corrosion inhibitor may be added to the tire sealing and balancing composition. The corrosion inhibitor may be in an amount of, by weight, from about 0.5 to about 10 percent of the tire balancing and sealing composition and is a mixture of sodium nitrite and sodium tetraborate pentahydrate. The mixture having the weight from 1 part sodium nitrite to 1 part sodium tetraborate pentahydrate to 10 parts sodium nitrite to 1 part sodium tetraborate pentahydrate may be used, but, preferably, a ratio of 8 parts sodium nitrite to 1 part sodium tetraborate pentahydrate is used.

Since a borate inhibitor is added care must be taken to keep the pH well below 4.9 or gellation may occur. It is preferable in preparing the aqueous solution of polyvinyl alcohol to maintain the pH at or about 3.5. This may be done by the addition of phosphoric acid.

In order to prevent freezing of the composition during the winter months, an antifreeze component, preferably ethylene or diethylene glycol, is added. The ratio of glycol to water by volume is from about 40:60 to about 60:40. At the latter ratio the composition will remain in liquid form down to about −60° F. (−50° C.). The former ratio will prevent freezing down to about −30° F. (−34° C.).

A bactericide such as benzyl bromoacetate, for example, MERBAC 35, manufactured by Merck Company of Rahway, N.J., may also optionally be added to the aqueous polyvinyl solution. DOWICIDE A, manufactured by the Dow Chemical Company may also be used.

Finally, if it is desired to color the tire sealing and balancing composition a dye compatible therewith such as thalo blue dye may be added.

The organic vapor phase corrosion inhibitors of this invention may generally be added at any point in the formulation of the foregoing sealing and balancing composition; however it is preferred to add them at the end of the preparation of the tire balancing and sealing composition, after adjusting the pH thereof to obtain a neutral environment at which the stability of the organic vapor phase corrosion inhibitors is maximal. The volatile amines or their salts are preferably added as glycol solutions of water and glycol solutions.

Tire balancing and sealing compositions comprising methylcellulose solutions containing fibrous components are also among the suitable delivery vehicles.

The methylcellulose tire balancing and sealing compositions generally comprise from about 2% to about 8% by weight fibrous component, usually asbestos and fiberglass, about 0.1% to about 5% by weight of methylcellulose, about 12% to about 60% by weight of ethylene glycol, about 40% to about 85% by weight water, and dispersing agents present in an amount by weight of less than 3% and about 0.5 to about 5% corrosion inhibitors (vapor phase and liquid phase)—the vapor phase corrosion inhibitors of this invention are present in an amount of from about 0.01% to about 0.5%.

A suitable methylcellulose tire balancing and sealing and volatile organic amine batch formulation is prepared by first adding 2 gallons (7.6 liters) of a wetting or dispersing agent, 15 pounds (6.8 kilograms) of bactericide, and 20 pounds (9.1 kilograms) of fiberglass are added to 1250 gallons (4,731.8 liters) of water which is at a temperature generally no hotter than 75° F. (23.9° C.) and the mixture stirred for 3 minutes. The pH is adjusted between about 7 and 7.5. Thereafter 100 gallons (378.5 liters) of ethylene glycol was added and the resultant mixture stirred for 2 minutes. The pH is again adjusted between 10 and 10.5 with stirring of the solution for 15 minutes. Fifty to one-hundred fifty pounds (22.7 to 68.0 kilograms) of methylcellulose wetted with fifty to one-hundred fifty gallons (189.3 to 567.8 liters) of cool glycol is then added. Ten to forty pounds (4.5 to 18.1 kilograms) of a volatile organic amine corrosion inhibitor, cyclohexyl amine nitrite, and optionally forty-five to one-hundred fifteen pounds (20.4 to 52.2 kilograms) of a liquid phase corrosion inhibitor dissolved in glycol or a water and glycol solution are added, followed by addition of another 450 gallons (1,703.4 liters) of glycol. The total viscosity as measured with a Haake viscometer at 84° F. (29° C.) is generally from about 1000 to about 3000 centipoise.

The amount introduced into the tire depends on tire size, use and rim condition. Generally from about 4 to about 24 fluid ounces are used in passenger car tires and about 24 to about 56 fluid ounces for commercial over the road vehicle tires.

EXAMPLE

A 2,000 gallon (7,570.8 liters) batch of sealing and balancing solution containing the volatile organic amine of this invention is prepared in the following manner.

Fan 400 pounds (181.4 kilograms) of polyvinyl alcohol into 400 gallons (1,514.2 liters) of cold ethylene glycol in a 2,000 gallon (7,570.8 liters) tank while the ethlene glycol is being stirred and continue stirring for about 15 minutes. The temperature of the cold ethylene glycol is from about 50° F. (10° C.) to about 90° F. (32.2° C.).

Then add 400 gallons (1,514.2 liters) of hot water (170°–190° F. or 76.7°–87.8° C.) while continuing the stirring. Continue the stirring after addition of the water. Stirring should be constant and for about one hour including the addition time.

Adjust the pH to 3.5 with concentrated (75–85%) phosphoric acid and stir for 2 hours. Then let the solution stand overnight or about 12 hours or more.

Add 300 more gallons (1,135.6 liters) of cold ethylene glycol to the solution while stirring.

Dissolve 400 pounds (181.4 kilograms) of sodium nitrite and 50 pounds (22.7 kilograms) of sodium tetraborate pentahydrate in hot water to form a 40% slurry and add slurry to the solution.

Check the pH of the resulting solution and, if necessary, adjust the pH to about 3.5. Phosphoric acid may be used for this purpose.

Mix 800 pounds (362.9 kilograms) of asbestos fibers with 40 pounds (18.1 kilograms) of fiberglass fibers and soak the mixture in 200 gallons (757.1 liters) of water containing a wetting agent for about 2 hours. ADVOWET-33, a non-ionic, non-foaming, activate wetting agent manufactured by Advance Solvents and Chemical Corporation of New York, N.Y., is a suitable wetting agent. One pint of ADVOWET-33 is dissolved in 5 gallons (18.9 liters) of water and then one gallon (3.8 liters) of this solution is added to the 200 gallons (757.1 liters) of water used for soaking.

After the asbestos-fiberglass mixture has been soaked at least 2 hours, the fibers including water and wetting agent are combined with the solution with stirring.

Fifteen pounds (6.8 kilograms) of benzyl-bromoacetate (MERBAC-45, manufactured by the Merck Chemical Company of Rahway, N.J.) is mixed with 5 gallons (18.9 liters) ethylene glycol and the resulting mixture is added to the fiber-containing solution. Ten to forty pounds (4.5 to 18.1 kilograms) of a volatile organic amine corrosion inhibitor, cyclohexyl amine nitrite, and optionally forty-five to one-hundred fifteen pounds of a liquid phase corrosion inhibitor dissolved in glycol or a water and glycol solution are added, followed by addition of another 450 gallons (1,703.4 liters) of glycol.

For color, 1-2 gallons (38-7.6 liters) of thalo blue dye are added.

The fiber-containing-solution is stirred for about 4 hours.

The resulting tire sealer and balancer is ready for introduction into a tire. Introduction is most simply and conveniently effected through the valve stem.

Ordinarily about 2-5% by volume of the composition is injected into the tire. For example, a 6.00×16 tire (commonly used for such as pick-up trucks or passenger cars) would be supplied interiorly with 16 ounces (453.6 grams) of the composition; as respects larger tires, for example, a truck tire of a 4 feet (1.2 meters) diameter, 56 ounces (1,587.6 grams) of the tire sealer and balancer would be injected into the tire.

Although other alternates and substitutes may be made without departing from the spirit of the invention, it is to be understood that the scope thereof is to be measured only by the limitations of the several claims appended hereto.

Having described my invention, I claim:

1. A method of imparting corrosion resistance to the metallic tire reinforcement elements within the elastomeric carcass of a tire which comprises introducing within said tire an aqueous tire sealing composition containing an organic volatile amine or amine salt capable of volatilizing within said tire, migrating to said elastomer, permeating said elastomer and reaching the metallic tire reinforcement elements; said sealing composition further containing a wheel corrosion inhibitor of a mixture of sodium nitrite and sodium tetraborate pentahydrate in ratios of weight of from 1:1 to 10:1.

2. The method of claim 1, further characterized in that the ratio of sodium nitrite to sodium tetraborate pentahydrate is 8:1 by weight.

3. The method of claim 1, further characterized in that said organic volatile amine or amine salt being selected from the group consisting of isopropylamine, dibutylamine, diisopropylamine, cyclohexylamine, dicyclohexylamine, isopropylhexylamine, ethylmorpholine, naphthylamine, the benzoate, carbonate or nitrite salts thereof and mixtures thereof.

4. The method of claim 3 further characterized in that said amine salt is cyclohexylamine nitrite.

5. An aqueous liquid tire sealing composition capable of imparting corrosion resistance to metallic wire belts of belted elastomeric tires comprising: an aqueous solution of polyvinyl alcohol, the ratio of polyvinyl alcohol to water being from about 0.5:100 to about 1:100; a fibrous component of asbestos and fiberglass fibers, said fibrous component being present in an amount of from about 4% to about 10% by weight of said liquid tire sealing composition; an organic volatile amine or amine salt capable of volatilizing within said tire, migrating to said elastomer, permeating the said elastomer and reaching the metallic wire belts thereof, said amine or amine salt being present in an amount of from about 0.01% to about 0.5% by weight of said liquid tire sealing composition; and a wheel corrosion inhibitor of a mixture of sodium nitrite and sodium tetraborate pentahydrate in ratios by weight from 1:1 to 10:1.

6. The tire sealing composition of claim 5, further characterized in that the ratio of sodium nitrite to sodium tetraborate pentahydrate is 8:1 by weight.

7. The tire sealing composition of claim 6, further characterized in that the inhibitor mixture is added to water to form a slurry with a 40% concentration.

8. The tire sealing composition of claim 5, further characterized in that said organic volatile amine or amine salt is selected from the group consisting of lower alkylamines, lower cycloalkylamines, naphthylamines, morpholines, benzothiazoles, and benzoate, carbonate and nitrite salts of said lower alkylamines, said lower cycloalkylamines, said naphthylamines, said morpholines and said benzothiazoles.

9. The tire sealing composition of claim 8, further characterized in that said organic volatile amine or amine salt is selected from the group consisting of isopropylamine, dibutylamine, diisopropylamine, cyclohexylamine, dicyclohexylamine, isopropylhexylamine, ethylmorpholine, naphthylalmine, the benzoate carbonate or nitrite salts thereof and mixtures thereof.

10. The liquid tire sealing composition of claim 5, further characterized in that the ratio of asbestos to fiberglass fibers is from about 20:1 to about 100:1 said asbestos fibers are from about 0.01 to about 3.0 inches in length and the fiberglass fibers are about 0.25 inches±0.125 inches in length.

11. The liquid tire sealing composition of claim 10 further characterized in that said amine salt is cyclohexylamine nitrite.

12. An aqueous liquid tire sealing composition capable of imparting corrosion resistance to metallic belts of belted tire comprising: about 0.1% to about 5% by weight methylcellulose; about 12% to about 60% by weight ethylene glycol; about 40% to about 85% by weight water; a fibrous component of fiberglass and asbestos fibers, said fibrous component being present in an amount of from about 2% to about 4% by weight of said liquid tire sealing composition; an organic volatile amine or amine salt capable of volatilizing within said tire, migrating to said elastomer, permeating the said elastomer and reaching the metallic wire belts thereof, said organic volatile amine or amine salt selected from the group consisting of isopropylamine, dibutylamine, diisopropylamine, cyclohexylamine, dicyclohexylamine, isopropylhexylamine, ethylmorpholine, naphthylamine, the benzoate, carbonate or nitrite salts thereof and mixtures thereof, said amine or amine salt being present in an amount of from about 0.01% to about 0.5% by weight of said liquid tire sealing composition; and a wheel corrosion inhibitor of a mixing of sodium nitrite and sodium tetraborate pentahydrate in ratios by weight from 1:1 to 10:1.

* * * * *